United States Patent [19]

Abdunur

[11] Patent Number: 4,527,431
[45] Date of Patent: Jul. 9, 1985

[54] ULTRA-FLAT PRESSURE PLATE MATERIAL TESTER AND METHOD FOR ITS MANUFACTURE

[75] Inventor: Charles S. Abdunur, Paris, France

[73] Assignee: Etat Francais représenté par le Ministere de l'Urganisme et du Logement Laboratoire Central des Ponts et Chaussees, France

[21] Appl. No.: 525,313

[22] Filed: Aug. 22, 1983

[30] Foreign Application Priority Data

Aug. 27, 1982 [FR] France ................... 82 14746

[51] Int. Cl.³ .................................... G01N 3/10
[52] U.S. Cl. .............................. 73/803; 73/84
[58] Field of Search ............. 73/784, 84, 729, 386, 73/803; 92/35, 103 M; 413/1; 220/75; 254/93 HP

[56] References Cited

U.S. PATENT DOCUMENTS

| 2,966,871 | 1/1961 | Gear | 113/24 |
| 3,595,071 | 7/1971 | Da Rocha | 73/784 |
| 4,326,420 | 4/1982 | Perham | 73/768 |

FOREIGN PATENT DOCUMENTS

| 2904844 | 8/1980 | Fed. Rep. of Germany . |
| 746102 | 4/1956 | France . |
| 1438577 | 4/1965 | France . |

Primary Examiner—Jerry W. Myracle
Attorney, Agent, or Firm—Lerner, David, Littenberg, Krumholz & Mentlik

[57] ABSTRACT

The ultra-flat pressure plate material tester for sounding concrete, comprises two facing side plates in the form of circular segments, of which the circular edges are turned back inwards by more than 90° and assembled against one another by a flexible weld. The rectilinear edges of the side plates are assembled by using a U shaped obturator. Two elements for coupling to the hydraulic circuit are provided.

6 Claims, 7 Drawing Figures

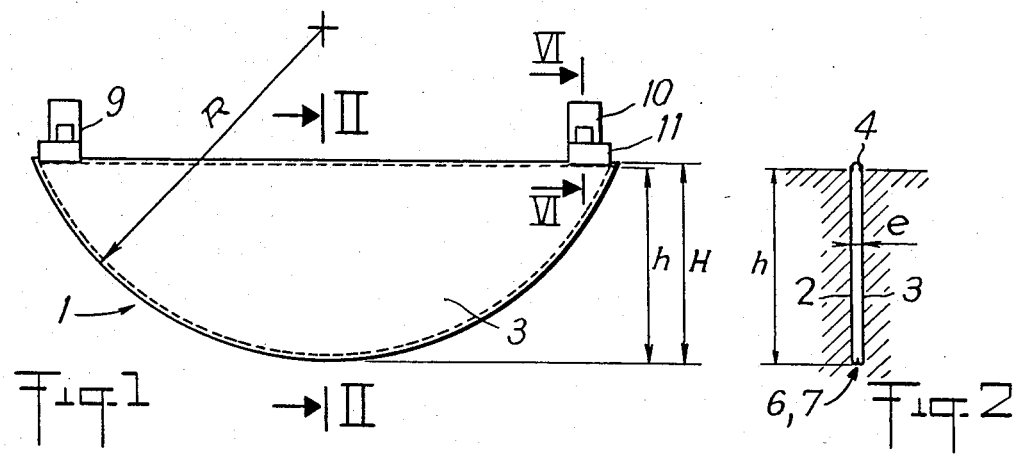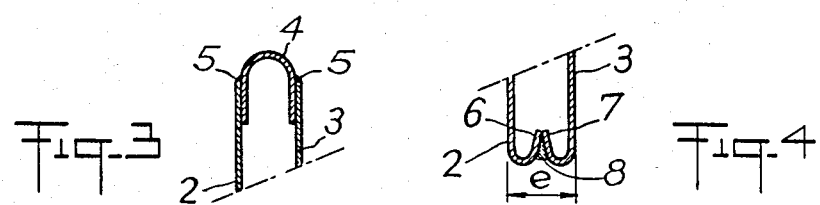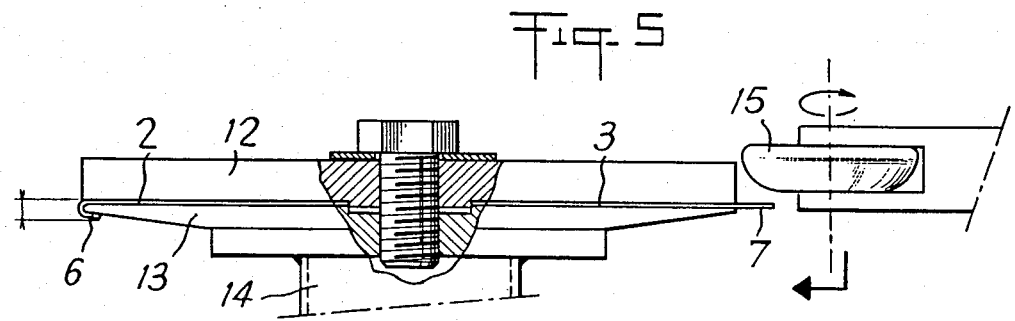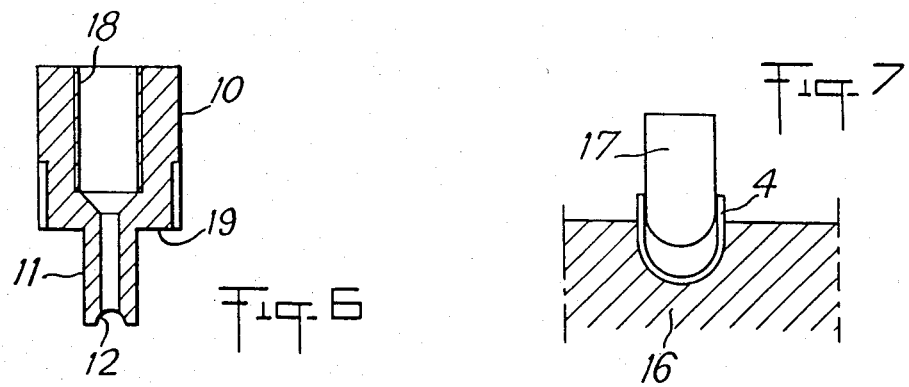

ULTRA-FLAT PRESSURE PLATE MATERIAL TESTER AND METHOD FOR ITS MANUFACTURE

BACKGROUND OF THE INVENTION

The invention relates to an ultra-flat pressure plate material tester and more particularly to ultra-flat material testers for measuring stresses.

In concrete construction, the direct measurement of absolute internal stresses is an essential element for evaluating its residual strength capacity. In the absence of any other means, a direct stress-release measuring method has been adopted. It consists of forming a kerf in the concrete with a circular saw, then re-establishing the strain-field by means of an ultra-flat material tester adapted to this kerf. The compensation pressure indicates the stress sought. This is a method used in geological survey but of which the crude transposition to concrete had, in the past, left failures. In fact, the differences in scale and in nature between the two materials require the taking into account of an increased number of parameters.

Through the documents U.S. Pat. No. 4,326,420 and DE-A No. 2,904,844, material testers are already known for measuring forces in a kerf formed in concrete or another medium.

However, testers, designed in a circular shape, have within a kerf formed by a circular saw, a surface which is always different from the surface freed by the kerf, the difference being further increased by the fact that the effective surface of the tester is reduced by reason of its convex deformation.

Through this fact, the testers cannot be used simply and reliably for measuring absolute internal stresses, and still less to achieve a stress gradient through a range of kerfs of standardized sizes.

GENERAL DESCRIPTION OF THE INVENTION

It is an object of the invention to provide a novel tester of flat construction, as well as a particular technology for its manufacture, free of the aforesaid drawbacks and reconciling better the following essentials:

a miniaturization imposed by the need to reduce the destructive character of the measurement;

minimization of natural stiffness, rendered difficult by miniaturisation and however indispensable in order that the transmission of the pressure to the walls of the kerf should be faithful and uniform;

strength enabling the pressure to reach the level of the stresses encountered in the constructions being sounded, application of the tester to substantially the whole of the walls of the kerf.

This purpose is achieved, according to the invention, by providing a material tester composed essentially of a chamber bounded by two facing side-plates shaped as circular segments, an obturator of the rectilinear edge of the chamber, the circular edges of the side plates being turned over inwardly by more than 90° and assembled against one another, advantageously by a flexible weld.

This particular structure of the edges enables the flanges of the tester to be moved, under the influence of the pressure, substantially parallel to themselves, the welded circular edges spreading out in somewhat accordion fashion.

The rectilinear edges of the side plates are advantageously assembled by a U shaped obturator which is brazed to them. This assembly, less flexible than that of the circular edges, is better suited to the rectilinear edges since they occur above the measuring kerf. In fact, the unbalanced, excess pressure of the U shaped portion, neutralizes the rigidity of the obturator under flexion; in addition, the U shape withstands better than the W shape, the outward thrust; finally this shape has less technological difficulties of construction.

The circular segment shape of the tester according to the invention enables the latter to correspond exactly to the shape of the circular kerfs, and hence to measure stresses reliably. By successive kerfs, it is possible to achieve a direct knowledge of the stress gradient.

The thickness of the testers of the invention is advantageously of the order of 4 mm.

BRIEF DESCRIPTION OF THE DRAWINGS

The invention will be better understood on reading the description which follows given with reference to the accompanying drawings and purely by way of non-limiting illustration.

In the drawings:

FIG. 1 shows in front view a tester according to the invention;

FIG. 2 is a section along the line II—II of FIG. 1, which also specifies the position of the tester with respect to the medium under examination, shown by hatched lines;

FIG. 3 shows on an enlarged scale the upper detail of FIG. 2, that is to say the assembly of the rectilinear edges of the side plates with the U shaped obturator, FIG. 4 shows on an enlarged scale the lower detail of FIG. 2, that is to say the assembly of the circular edges of the side plates, FIG. 5 is a diagram of a manufacturing installation for the side plates of a tester according to the invention, FIG. 6 shows the detail of the coupling member to the hydraulic circuit (section VI—VI of FIG. 1), FIG. 7 shows the step of shaping the obturator of a tester of the invention.

DESCRIPTION OF A PREFERRED EMBODIMENT

The ultra-flat tester 1 comprises two side plates 2 and 3 in circular segments of radius R=150 mm for example, formed in sheet metal of 0.4 mm thickness. It is possible to provide, for example, a range of testers manufactured with respective penetration depths h of 20, 30, 40, 50, 60 mm etc. for a same thickness e of 4 mm, the total height H being slightly greater.

The upper rectilinear edges of the side plates 2 and 3 are assembled by means of a longitudinal obturator 4, of U shape, fastened by welds 5 to the edges of the side plates which enclose the sides of the obturator 4 (FIG. 3).

The circular edges 6 and 7 of the side plates 2 and 3 are turned over inwards by almost 180° and are assembled to one another, on their convex surface (FIG. 4), by a flexible weld 8. Two coupling members 9 and 10 enable connection to the hydraulic circuit. It is seen in the section of FIG. 6, that they comprise an elongated shoulder 11 of which the base 12 is U shaped to adapt itself to the obturator 4 on which they are brazed.

The manufacture of the ultra-flat testers of the invention is as follows.

The side plates are cut out with a radius R+5 mm, the burrs are removed and they are annealed.

The two side plates 2 and 3 are then enclosed with good symmetry between a disc 12 and a tapered former 13 leaving a regular overlap of 5 mm (FIG. 5). The assembly is mounted on a lathe 14.

The overlapping portions of the metal sheets are then rounded by means of a suitable tool, to an overlap of 3 mm.

The edges 6 and 7 are pressed down by means of a milling wheel 15, until they mate the tapered former by clamping them with the milling wheel on the tapered edged 13, the rotary speed of the lathe being minimal. The side plates are dismounted and the folded back edge is machined to obtain the width dimension of 2 mm, namely half the thickness of the tester.

To make the obturator 4, a strip of sheet metal is cut out to a width of 10 mm and of length equal to that of the rectilinear edges of the side plates, and the strip of sheet metal is given its U shape by press-forming in a die 16 by means of a punch bar 17, (FIG. 7).

By means of internal shims, the two side plates are fixed along their circular edges 6, 7, with a flexible weld, then the obturator 4 is welded.

The coupling elements 9 and 10 are brazed to the obtruator, then a hole of 2 mm is pierced in the obturator 4 in the axis of the threaded hole 18 provided in each coupling element.

In operation, it is possible to use any one of the coupling units; the other can be plugged after filling with oil, with a screw-plug.

A general burr removal terminates the fabrication.

When they are placed in the cut formed in the medium being sounded (FIG. 2), the testers are supported on the edge of the cut by the shoulders 19 of the coupling elements 9 and 10.

Testers manufactured by this method have been checked to test their capacity to re-establish the stress and strain field, disturbed by the presence of a cut in a medium under stress.

For this purpose, several trials were carried out on Plexiglas models by two complementary optical methods (photo-elastic test and moire pattern test).

These tests have confirmed the quality and reliability of the measurements carried out by the testers of the invention and their capacity to ensure the reliable and uniform transmission of a pressure of 0 to 9 MPa.

I claim:

1. Ultra-flat pressure plate material tester, comprising a chamber capable of being placed under pressure, said chamber being defined by two facing side plates shaped as circular segments with a rectilinear edge and a circular edge, and by a rectilinear obturator joining the rectilinear edges of the side plates, the circular edges of the side plates being turned back towards one another by more than 90° and assembled to one another to close said chamber.

2. Tester according to claim 1, wherein the circular edges of the side plates are assembled by a flexible weld.

3. Tester according to claim 2, wherein the rectilinear edges of the side plates are assembled by means of a U shaped obturator.

4. Tester according to claim 3, wherein the side plates are formed of sheet metal of 0.4 mm thickness.

5. Tester according to claim 3, having a thickness of about 4 mm.

6. Tester according to claim 3, comprising at least one coupling element to an hydraulic circuit.

* * * * *